United States Patent
Kim et al.

(10) Patent No.: US 10,370,517 B2
(45) Date of Patent: Aug. 6, 2019

(54) PLASTICIZER COMPOSITION, RESIN COMPOSITION AND METHODS FOR PREPARING THEREOF

(71) Applicant: LG CHEM, LTD., Seoul (KR)

(72) Inventors: Hyun Kyu Kim, Daejeon (KR); Mi Yeon Lee, Daejeon (KR); Jeong Ju Moon, Daejeon (KR); Joo Ho Kim, Daejeon (KR); Seok Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/542,523

(22) PCT Filed: Mar. 18, 2016

(86) PCT No.: PCT/KR2016/002787
§ 371 (c)(1),
(2) Date: Jul. 10, 2017

(87) PCT Pub. No.: WO2016/153235
PCT Pub. Date: Sep. 29, 2016

(65) Prior Publication Data
US 2018/0265672 A1 Sep. 20, 2018

(30) Foreign Application Priority Data

Mar. 20, 2015 (KR) .................. 10-2015-0039000
Mar. 25, 2015 (KR) .................. 10-2015-0041793
Mar. 17, 2016 (KR) .................. 10-2016-0032374

(51) Int. Cl.
| | |
|---|---|
| *C08K 5/12* | (2006.01) |
| *C08J 5/18* | (2006.01) |
| *C08L 101/00* | (2006.01) |
| *C08K 5/11* | (2006.01) |
| *C08K 5/1515* | (2006.01) |
| *C08L 23/06* | (2006.01) |
| *C08L 23/08* | (2006.01) |
| *C08L 23/12* | (2006.01) |
| *C08L 25/06* | (2006.01) |
| *C08L 27/06* | (2006.01) |
| *C08L 75/04* | (2006.01) |
| *C08L 91/00* | (2006.01) |
| *C08K 5/00* | (2006.01) |

(52) U.S. Cl.
CPC .................. *C08K 5/12* (2013.01); *C08J 5/18* (2013.01); *C08K 5/11* (2013.01); *C08K 5/1515* (2013.01); *C08L 23/06* (2013.01); *C08L 23/0853* (2013.01); *C08L 23/12* (2013.01); *C08L 25/06* (2013.01); *C08L 27/06* (2013.01); *C08L 75/04* (2013.01); *C08L 91/00* (2013.01); *C08L 101/00* (2013.01); *C08K 5/0016* (2013.01); *C08K 2201/014* (2013.01); *C08L 2203/16* (2013.01); *C08L 2203/20* (2013.01)

(58) Field of Classification Search
CPC .. C08K 5/12; C08K 5/11; C08L 23/06; C08L 23/0853; C08L 23/12; C08L 25/06; C08L 27/06; C08L 75/04; C08L 91/00; C08L 2203/16; C08L 2203/20
USPC ......................................................... 524/296
See application file for complete search history.

(56) References Cited

U.S. PATENT DOCUMENTS

| | | | | |
|---|---|---|---|---|
| 2013/0317152 | A1* | 11/2013 | Becker | .................. C08L 33/10 524/296 |
| 2014/0162045 | A1* | 6/2014 | Bourassa | .................. C08J 5/18 428/220 |
| 2014/0205778 | A1* | 7/2014 | Sakai | .................. C08K 5/12 428/35.2 |

FOREIGN PATENT DOCUMENTS

| | | |
|---|---|---|
| CN | 102272215 A | 12/2011 |
| CN | 102964723 A | 3/2013 |
| CN | 103313847 A | 9/2013 |
| CN | 103930483 A | 7/2014 |
| DE | 20-2013-105795 U1 | 2/2014 |
| JP | 2014224275 A | 12/2014 |
| KR | 20140005908 A | 1/2014 |
| KR | 20140052838 A | 5/2014 |
| KR | 20140132683 A | 11/2014 |

OTHER PUBLICATIONS

XP002785014: Database WPI Week Jan. 2014 Thomson Scientific, London, GB, AN 2013-J73388 , pp. 1-2. (Corresponds to CN 102964723A, published Mar. 13, 2013).

\* cited by examiner

*Primary Examiner* — Hui H Chin
(74) *Attorney, Agent, or Firm* — Dentons US LLP

(57) ABSTRACT

The present invention relates to a plasticizer composition, a resin composition and methods for preparing thereof, and, by improving poor physical properties having been caused by structural limitation, provides a plasticizer capable of improving physical properties such as plasticizing efficiency, a migration property, tensile strength, an elongation rate, stress migration and light resistance required for sheet formularization when used as a plasticizer of a resin composition, and a resin composition comprising the same.

12 Claims, No Drawings

PLASTICIZER COMPOSITION, RESIN COMPOSITION AND METHODS FOR PREPARING THEREOF

CROSS-REFERENCE TO RELATED APPLICATIONS

This application is a 35 USC § 371 National Stage entry of International Application No. PCT/KR2016/002787 filed on Mar. 18, 2016, which claims priority to and the benefits of Korean Patent Application No. 10-2015-0039000 filed with the Korean Intellectual Property Office on Mar. 20, 2015, Korean Patent Application No. 10-2015-041793 filed with the Korean Intellectual Property Office on Mar. 25, 2015 and Korean Patent Application No. 10-2016-0032374 filed with the Korean Intellectual Property Office on Mar. 17, 2016, the entire contents of which are incorporated herein by reference.

FIELD OF THE INVENTION

The present invention relates to a plasticizer composition, a resin composition and methods for preparing thereof.

DESCRIPTION OF THE RELATED ART

In common plasticizers, alcohols react with polycarboxylic acids such as phthalic acid and adipic acid to prepare esters corresponding thereto. In addition, studies on plasticizer compositions capable of replacing phthalate-based plasticizers such as terephthalate-based, adipate-based and other polymer-based have been continued considering domestic and overseas restrictions on phthalate-based plasticizers harmful to the human body.

Meanwhile, for manufacturing flooring materials, wallpapers, products in sheet industries and the like, proper plasticizers need to be used considering discoloration, a migration property, processability and the like. A plasticizer, a filler, a stabilizer, a viscosity depressant, a dispersant, an antifoaming agent, a foaming agent and the like are mixed to a PVC resin depending on tensile strength, an elongation rate, light resistance, a migration property, a gelling property, processability or the like, properties required for each industry in such various applications.

As one example, when using dioctyl terephthalate that is relatively inexpensive among plasticizer compositions capable of being used in PVC, viscosity has been high, an absorption rate of the plasticizer has relatively decreased, and a migration property has not been favorable as well.

Accordingly, continuous studies on technologies capable of being optimally used as a plasticizer for vinyl chloride-based resins, which are achieved through developing products superior to the existing dioctyl terephthalate, or products of new compositions comprising dioctyl terephthalate, have been required.

DISCLOSURE OF THE INVENTION

Technical Problem

In view of the above, while continuously performing researches on plasticizers, the inventors of the present invention have identified a plasticizer composition capable of improving poor physical properties having been caused by structural limitation, and completed the present invention.

In other words, an object of the present invention is to provide a plasticizer capable of improving physical properties such as plasticizing efficiency, a migration property and a gelling property required in formularization of sheets and the like when used as a plasticizer of a resin composition, a method for preparing the same, and a resin composition comprising the same.

Technical Solution

One embodiment of the present invention provides a plasticizer composition comprising one kind of terephthalate-based material; and epoxidized oil, wherein weight ratio of the terephthalate-based material and the epoxidized oil is from 99:1 to 1:99.

The weight ratio of the terephthalate-based material and the epoxidized oil may be from 95:5 to 50:50.

The weight ratio of the terephthalate-based material and the epoxidized oil may be from 90:10 to 50:50.

The terephthalate-based material may be any one selected from the from consisting of di(2-ethylhexyl) terephthalate (DEHTP or DOTP), diisononyl terephthalate (DINTP), dibutyl terephthalate (DBTP), butylisononyl terephthalate (BINTP), butyl(2-ethylhexyl) terephthalate (BEHTP or BOTP) and (2-ethylhexyl)isononyl terephthalate (EHINTP or OINTP).

The terephthalate-based material may be di(2-ethylhexyl) terephthalate or diisononyl terephthalate.

The epoxidized oil may comprise at least one selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

The plasticizer composition may further comprise an additive, and the additive may comprise an acetyl citrate-based material, a trimellitate-based material or a mixture thereof.

The additive may be comprised in an amount of 1 part by weight to 100 parts by weight based on 100 parts by weight of the plasticizer composition.

The acetyl citrate-based material may comprise at least one selected from the group consisting of a hybrid C4-C9 alkyl substituted acetyl citrate and a non-hybrid C4-C9 alkyl substituted acetyl citrate.

The trimellitate-based material may comprise at least one selected from the group consisting of tributyltrimellitate (TBTM), triisononyltrimellitate (TINTM) and tri(2-ethylhexyl)trimellitate (TOTM or TEHTM).

Another embodiment of the present invention provides a method for providing a plasticizer composition, the method comprises providing a terephthalate-based material and epoxidized oil; and blending the terephthalate-based material and the epoxidized oil at weight ratio of 99:1 to 1:99 to prepare a plasticizer composition.

After blending to prepare the plasticizer composition, the method may further comprise mixing 1 part by weight to 100 parts by weight of an additive based on 100 parts by weight of the plasticizer composition.

Still another embodiment of the present invention provides a resin composition comprising 100 parts by weight of a resin; and 5 parts by weight to 150 parts by weight of the plasticizer composition of Claim 1.

The resin may be at least one selected from the group consisting of ethylene vinyl acetate, polyethylene, polypropylene, polyketone, polyvinyl chloride, polystyrene, polyurethane and thermoplastic elastomers.

The resin composition may be material for at least one selected from the group consisting of wires, flooring materials, automotive interior materials, films, sheets, wallpapers and tubes.

Advantageous Effects

A plasticizer composition according to one embodiment of the present invention may provide excellent properties such as migration resistance and volatility resistance as well as excellent plasticizing efficiency, tensile strength and elongation rate when used in a resin composition.

BEST MODE FOR CARRYING OUT THE INVENTION

EXAMPLE

Hereinafter, the present invention will be described in detail with reference to examples. However, the examples according to the present invention may be modified to various other forms, and the scope of the present invention should not be construed as being limited to the examples described below. The examples of the present invention are provided in order to more completely describe the present invention for those having average knowledge in the art.

Preparation Example 1: Preparation of DOTP

To a 4-neck 3 liter reactor provided with a cooler, a condenser, a decanter, a reflux pump, a temperature controller, a stirrer and the like, 498.0 g of purified terephthalic acid (TPA), 1170 g of 2-ethylhexyl alcohol (2-EH) (molar ratio of TPA:2-EH was (1.0):(3.0)), and 1.54 g of a titanium-based catalyst (TIPT, tetra isopropyl titanate) as a catalyst (0.31 parts by weight based on 100 parts by weight of the TPA) were added, and the temperature was slowly raised up to approximately 170° C. Water started to be generated near approximately 170° C., and esterification was conducted for approximately 4.5 hours while continuously adding nitrogen gas at a reaction temperature of approximately 220° C. and under atmospheric pressure, and the reaction was completed when an acid value reached 0.01.

After the reaction was complete, extractive distillation was conducted for 0.5 hours to 4 hours under reduced pressure in order to remove unreacted raw materials. Steam distillation was conducted for 0.5 hours to 3 hours under reduced pressure using steam in order to remove unreacted raw materials to a specific content level or lower, and neutralization treatment was carried out using an alkali solution after cooling the reaction solution to approximately 90° C. Water flushing may be additionally carried out and then moisture was removed through dehydrating the reaction solution. A filter medium was added to the moisture-removed reaction solution, and the result was stirred for a certain period of time and then filtered to finally prepare 1326.7 g of di-2-ethylhexyl terephthalate (yield: 99.0%).

Preparation Example 2: Preparation of DINTP

DINTP was prepared in the same manner as in Preparation Example 1 except that isononyl alcohol was used instead of 2-ethylhexyl alcohol in the esterification reaction.

Preparation Example 3: Preparation of TOTM 384.2 g of trimellitic acid and 1171 g of octanol were used as reaction raw materials to finally prepare 1071 g of trioctyl trimellitate (yield: 98%).

Preparation Example 4: Preparation of TINTM 384.2 g of trimellitic acid and 1230 g of isononyl alcohol were used as reaction raw materials to finally prepare 1154 g of triisononyl trimellitate (yield: 98%).

Preparation Example 5: Preparation of TBTM 576.3 g of trimellitic acid and 1000 g of butanol were used as reaction raw materials to finally prepare 1124 g of tributyl trimellitate (yield: 99%).

Preparation Example 6: Preparation of ATOC 384 g of citric acid and 1014 g of 2-ethylhexyl alcohol were used as reaction materials to prepare 1029 g of trioctyl citrate (trioctyl(2-ethylhexyl) citrate) (yield: 98%). 1119 g of acetyl trioctyl citrate (yield: 98%) was finally prepared by using 214 g of acetic anhydride to the trioctyl citrate prepared above.

Preparation Example 7: Preparation of ATBC 384 g of citric acid and 1000 g of butanol were used as reaction raw materials to prepare 706 g of tributyl citrate (yield: 98%). 789 g of acetyl tributyl citrate (yield: 98%) was finally prepared by using 214 g of acetic anhydride to the tributyl citrate prepared above.

Plasticizer compositions of Examples 1 to 4 were prepared using the materials prepared in Preparation Examples 1 to 7 and epoxidized oil, and the preparations are summarized in the following Tables 1 to 4. Physical property evaluations on the plasticizer compositions were carried out according to the following test items.

TABLE 1

|  | Terephthalate-based Material | Epoxidized Oil | Mixing Weight Ratio |
| --- | --- | --- | --- |
| Example 1-1 | Preparation Example 1 (DOTP) | ESO | 9:1 |
| Example 1-2 |  |  | 7:3 |
| Example 1-3 |  |  | 5:5 |
| Example 1-4 |  |  | 95:5 |
| Example 1-5 |  | ELO | 7:3 |

TABLE 2

|  | Terephthalate-based Material | Epoxidized Oil | Mixing Weight Ratio |
| --- | --- | --- | --- |
| Example 2-1 | Preparation Example 2 | ESO | 9:1 |
| Example 2-2 |  |  | 7:3 |

TABLE 2-continued

| | Terephthalate-based Material | Epoxidized Oil | Mixing Weight Ratio |
|---|---|---|---|
| Example 2-3 | (DINTP) | | 5:5 |
| Example 2-4 | | | 95:5 |
| Example 2-5 | | ELO | 7:3 |

| | Terephthalate-based Material | Epoxidized Oil | Additive | Mixing Weight Ratio |
|---|---|---|---|---|
| Example 3-1 | Preparation Example 1 (DOTP) | ESO | TOTM | 4:3:3 (Approximately 43 Parts) |
| Example 3-2 | | | | 5:2:3 (Approximately 43 Parts) |
| Example 3-3 | | | | 5:3:2 (Approximately 25 Parts) |
| Example 3-4 | | | | 4:2:4 (Approximately 67 Parts) |
| Example 3-5 | | | | 3:2:5 (Approximately 100 Parts) |
| Comparative Example 3-1 | | | | 2:2:6 (Approximately 150 Parts) |
| Example 3-6 | | | TINTM | 4:4:2 (Approximately 25 Parts) |
| Example 3-7 | | | | 5:3:2 (Approximately 25 Parts) |
| Example 3-8 | | | TBTM | 5:3:2 (Approximately 25 Parts) |
| Example 3-9 | | | | 4:3:3 (Approximately 43 Parts) |

TABLE 4

| | Terephthalate-based Material | Epoxidized Oil | Additive | Mixing Weight Ratio |
|---|---|---|---|---|
| Example 4-1 | Preparation Example 1 (DOTP) | ESO | ATOC | 4:3:3 (Approximately 43 Parts) |
| Example 4-2 | | | | 5:2:3 (Approximately 43 Parts) |
| Example 4-3 | | | | 5:3:2 (Approximately 25 Parts) |
| Example 4-4 | | | | 4:2:4 (Approximately 66 Parts) |
| Example 4-5 | | | | 3:2:5 (Approximately 100 Parts) |
| Comparative Example 4-1 | | | | 2:2:6 (Approximately 150 Parts) |
| Example 4-6 | | | ATBC | 4:3:3 (Approximately 43 Parts) |
| Example 4-7 | | | | 5:3:2 (Approximately 25 Parts) |
| Example 4-8 | | | | 4:4:2 (Approximately 25 Parts) |

<Test Items>

Measurement conditions for the following test items may be for illustrative purposes for describing measurement methods, and specific measurement and evaluation conditions for the test examples using other conditions may be referred to in each of the test examples.

Measurement on Hardness

Shore hardness at 25° C., 3T 10 s, was measured in accordance with the ASTM D2240.

Measurement on Tensile Strength

After pulling a cross head speed at 200 mm/min (1T) using U.T.M (manufacturer; Instron, model name; 4466), a test device, in accordance with the ASTM D638 method, the spot at which the specimen was cut was measured. Tensile strength was calculated as follows:

Tensile strength (kgf/mm$^2$)=load value (kgf)/thickness (mm)×width (mm)

Measurement on Elongation Rate

After pulling a cross head speed at 200 mm/min (1T) using the U.T.M in accordance with the ASTM D638 method, the spot at which the specimen was cut was measured, and then an elongation rate was calculated as follows:

Elongation rate (%)=[length after elongation/initial length]×100.

Measurement on Tensile and Elongation Retention

Measurement on tensile and elongation retention measures tensile and elongation rate properties remaining on the specimen after applying heat for a certain period of time at a specific temperature, and the methods of measurement are the same as the methods measuring the tensile strength and the elongation rate.

Measurement on Migration Loss

A specimen having a thickness of 2 mm or greater was prepared in accordance with the KSM-3156, and a load of 1 kgf/cm$^2$ was applied after attaching PS plates on both surfaces of the specimen. The specimen was left unattended for 72 hours in a forced convection oven (80° C.) and then taken out and cooled for 4 hours at room temperature. After that, the PS plates attached on both surfaces of the specimen were removed, weights before and after leaving the specimen unattended in the oven were measured, and the amount of migration loss was calculated through the equation such as below.

Amount of migration loss (%)=[(initial weight of specimen at room temperature-weight of specimen after being left unattended in oven)/initial weight of specimen at room temperature]×100

Measurement on Volatile Loss

After working on the prepared specimen for 72 hours at 80° C., the weight of the specimen was measured.

Volatile loss (%)=[(initial specimen weight-specimen weight after working)/initial specimen weight]×100.

Measurement on Absorption Rate

An absorption rate was evaluated such that the resin and the ester compound were mixed to each other under a condition of 77 and 60 rpm using a Planatary mixer (Brabender, P600), and the time taken for the torque of the mixer to be stabilized was measured.

Stress Test

As for the stress test, the specimen was left unattended for a certain period of time as being bent, and the degree of migration (the degree of oozing) was observed and expressed as a number. The number being closer to 0 represents excellent properties.

Measurement on Light Resistance

The specimen was held in QUV and UV irradiated for 200 hours in accordance with the method of ASTM 4329-13, and then a change in the color was calculated using a reflectometer.

Measurement on Thermal Resistance

The degree of discoloration in the initial specimen and the specimen after the volatile loss test using the volatile loss measuring method was measured. The measurement value was determined by the changed values in an E value with respect to L, a and b values using a colorimeter.

Measurement on Cold Resistance 5 prepared specimens were left unattended for 3 minutes at a specific temperature and then were hit, and a temperature at which 3 out of the 5 specimens were destroyed was measured.

Test Example 1: DOTP-Based Plasticizer Composition

Mixed plasticizer compositions were prepared by mixing DOTP and ESO or ELO in the mixing ratios of Examples 1-1 to 1-5 listed in Table 1, and these were used as specimens for the tests.

As for the preparation of the specimens, the specimens were prepared by, referring to the ASTM D638, mixing 50 parts by weight of the mixed plasticizer composition and 3 parts by weight of a stabilizer (BZ153T) to 100 parts by weight of PVC in a 3 L super mixer under 98° C. and 700 rpm, then making a 5 mm sheet by working on the result for 4 minutes at 160° C. using a roll mill, and then making a 1 mm to 3 mm sheet after pressing the result for 2.5 minutes at a low pressure and 2 minutes at a high pressure at 180° C. Physical properties were evaluated as each of the evaluation items described above using each specimen, and the results are summarized in the following Table 5.

As shown in Table 5, it was identified that the plasticizer composition of Examples 1-1 to 1-5 prepared by mixing epoxidized oil with DOTP (a terephthalate-based material), exhibited an equal or higher level in the physical properties such as tensile strength, hardness, an elongation rate or volatile loss, and exhibited an improved physical property of equal or higher in the migration loss, the stress resistance property and the elongation rate compared to the existing DOTP plasticizer of Comparative Example 1.

As above, it was identified that when a plasticizer composition was prepared by mixing terephthalate-based material and epoxidized oil, the plasticizer composition was capable of enhancing migration loss or resistance for stress while having an equal or higher level of basic physical properties of a plasticizer.

In addition, when a plasticizer composition comprised the epoxidized oil in a relatively small quantity, the plasticizer composition may not be suitable for the use of the plasticizer composition in terms of an absorption rate, volatile loss or stress test results, and therefore, in order to distinguish the epoxidized oil from epoxidized oil used as an auxiliary stabilizer, comprising the epoxidized oil in 5% by weight or greater, preferably in 10% by weight or greater and optimally 20% by weight or greater may be suitable for the actual use of the plasticizer.

Test Example 2: DINTP-Based Plasticizer Composition

Mixed plasticizer compositions were prepared by mixing DINTP with ESO or ELO at the mixing ratios of Examples 2-1 to 2-5 listed in Table 2, and these were used as specimens for the tests. The preparation of the specimens and the conditions of the physical property evaluations were the same as in Test Example 1, and the results are shown in the following Table 6.

TABLE 5

| | Plasticizer | Hardness (Shore "A") | Tensile Strength (kg/cm$^2$) | Elongation Rate (%) | Migration Loss (%) | Volatile Loss (%) | Absorption Rate (m:s) | Stress Test |
|---|---|---|---|---|---|---|---|---|
| Example 1-1 | ESO (1) | 83.0 | 214.3 | 346.4 | 5.48 | 2.38 | 6:35 | 2.5 |
| Example 1-2 | ESO (3) | 81.5 | 218.5 | 346.8 | 4.47 | 2.02 | 6:02 | 1.5 |
| Example 1-3 | ESO (5) | 80.2 | 217.6 | 356.2 | 3.24 | 1.63 | 5:39 | 1.5 |
| Example 1-4 | ESO (0.5) | 84.2 | 212.5 | 335.1 | 5.98 | 2.60 | 6:45 | 3.0 |
| Example 1-5 | ELO (3) | 79.5 | 218.0 | 344.9 | 3.97 | 2.01 | 5:57 | 1.5 |
| Comparative Example 1 | DOTP | 84.8 | 211.9 | 331.2 | 6.27 | 2.65 | 6:50 | 3.0 |

Hardness: 3T, 10 s
Tensile strength and elongation rate: 1T, 200 mm/min
Migration loss: 80° C., 1T, 1 kgf/cm$^2$, 72 hr
Volatile loss: 100° C., 72 hr
Absorption rate: 88° C.
Stress test: 23° C., 168 hr

TABLE 6

|  | Plasticizer | Hardness (Shore "A") | Tensile Strength (kg/cm$^2$) | Elongation Rate (%) | Migration Loss (%) | Volatile Loss (%) | Absorption Rate (m:s) | Stress Test |
|---|---|---|---|---|---|---|---|---|
| Example 2-1 | ESO (1) | 83.5 | 211.6 | 348.7 | 5.87 | 0.98 | 6:23 | 2.5 |
| Example 2-2 | ESO (3) | 82.1 | 217.1 | 357.5 | 5.55 | 0.88 | 6:12 | 1.5 |
| Example 2-3 | ESO (5) | 81.6 | 219.9 | 364.6 | 4.04 | 0.76 | 5:45 | 1.5 |
| Example 2-4 | ESO (0.5) | 84.6 | 211.9 | 335.2 | 6.11 | 2.45 | 6:45 | 3.0 |
| Example 2-5 | ELO (3) | 81.2 | 220.5 | 364.9 | 5.02 | 0.50 | 6:00 | 1.0 |
| Comparative Example 1 | DOTP | 84.8 | 211.9 | 331.2 | 6.27 | 2.65 | 6:50 | 3.0 |

As shown in Table 6, it was identified that Examples 2-1 to 2-5 preparing the plasticizer composition by mixing epoxidized oil with DINTP, a terephthalate-based material, exhibited an equal or higher level in the physical properties such as tensile strength, hardness, volatile loss and an elongation rate compared to the existing DOTP plasticizer of Comparative Example 1, and exhibited an improved physical property of equal or higher in the migration loss, the stress resistance property, the elongation rate and the tensile strength property compared to Comparative Example 1.

As above, it was identified that when a plasticizer composition was prepared by mixing a terephthalate-based material and epoxidized oil, the plasticizer composition was capable of enhancing migration loss or resistance for stress while having an equal or higher level of basic physical properties of a plasticizer.

In addition, when a plasticizer composition comprised the epoxidized oil in a relatively small quantity, the plasticizer composition may not be suitable for the use of the plasticizer composition in terms of an absorption rate, volatile loss or stress test results, and therefore, in order to distinguish the epoxidized oil from epoxidized oil used as an auxiliary stabilizer, including the epoxidized oil in 5% by weight or greater, preferably in 10% by weight or greater and optimally 20% by weight or greater may be suitable for the actual use of the plasticizer.

Test Example 3: Mixed Plasticizer Composition of DOTP, ESO and Trimellitate-Based Material Mixed plasticizer compositions were prepared by each mixing DOTP and ESO, and each of TOTM, TINTM and TBTM as an additive in the mixing ratios of Examples 3-1 to 3-9 and Comparative Example 3-1 listed in Table 3, and these were used as specimens for the tests.

As for the preparation of the specimens, the specimens were prepared by, referring to the ASTM D638, mixing 50 parts by weight of the mixed plasticizer composition, 40 parts by weight of a filler (OMYA1T), 5 parts by weight of a stabilizer (RUP-144) and 0.3 parts by weight of a lubricant (St-A) to 100 parts by weight of PVC in a 3 L super mixer under 98° C. and 700 rpm, making a compound by working on the result for 4 minutes at 160° C. using a roll mill, and then pressing the result for 2.5 minutes at a low pressure and 2 minutes at a high pressure at 180° C. Physical properties were evaluated as each of the evaluation items described above using each specimen, and the results are summarized in the following Table 7.

|  | Plasticizer | Hardness (Shore "A") | Tensile Strength (kg/cm$^2$) | Tensile Retention (%) | Elongation Rate (%) | Elongation Retention (%) | Migration Loss (%) | Volatile Loss (%) | Stress Test |
|---|---|---|---|---|---|---|---|---|---|
| Example 3-1 | TOTM (42) | 88.3 | 185.6 | 95.6 | 316.1 | 101.1 | 0.37 | 4.27 | 0 |
| Example 3-2 | TOTM (42) | 88.2 | 181.2 | 103.8 | 325.2 | 94.7 | 0.60 | 5.57 | 0.5 |
| Example 3-3 | TOTM (25) | 87.9 | 178.7 | 105.8 | 313.9 | 98.3 | 0.50 | 5.63 | 0.5 |
| Example 3-4 | TOTM (67) | 89.0 | 191.3 | 98.9 | 318.5 | 98.8 | 0.25 | 3.56 | 0 |
| Example 3-5 | TOTM (100) | 89.7 | 194.2 | 96.5 | 315.6 | 92.3 | 0.20 | 2.41 | 0 |
| Example 3-6 | TINTM (25) | 88.5 | 192.5 | 104.6 | 305.4 | 98.4 | 0.30 | 3.23 | 0 |
| Example 3-7 | TINTM (25) | 88.1 | 188.6 | 103.5 | 321.0 | 97.6 | 0.54 | 4.77 | 0 |
| Example 3-8 | TBTM (25) | 85.7 | 178.7 | 108.9 | 325.8 | 96.2 | 0.55 | 5.88 | 0 |
| Example 3-9 | TBTM (42) | 85.9 | 176.9 | 104.5 | 328.1 | 94.8 | 0.62 | 4.25 | 0 |
| Comparative Example 2 | DIDP | 89.7 | 174.3 | 97.0 | 305.6 | 92.6 | 1.45 | 4.88 | 0 |

-continued

|  | Plasticizer | Hardness (Shore "A") | Tensile Strength (kg/cm$^2$) | Tensile Retention (%) | Elongation Rate (%) | Elongation Retention (%) | Migration Loss (%) | Volatile Loss (%) | Stress Test |
|---|---|---|---|---|---|---|---|---|---|
| Comparative Example 3-1 | TOTM (150) | 92.8 | 798.7 | 80.3 | 298.6 | 88.2 | 0.20 | 2.23 | 0 |

Hardness: 3T, 10 s
Tensile strength and elongation rate: 1T, 200 mm/min
Tensile retention and elongation retention: 121° C., 168 hr
Migration loss: 80° C., 1T, 1 kgf/cm$^2$, 72 hr
Volatile loss: 113° C., 168 hr
Stress test: 23° C., 168 hr As shown in Table 7, it was identified that Examples 3-1 to 3-9 preparing the plasticizer composition by mixing epoxidized oil with DOTP, a terephthalate-based material, and further adding TOTM, TINTM and TBTM among trimellitate-based materials as the additive exhibited an equal or higher level in the physical properties such as tensile strength, volatile loss, migration loss and an elongation rate compared to the existing DIDP plasticizer of Comparative Example 1.

In addition, considering that physical properties such as hardness or tensile strength were more superior compared to DIDP, an existing plasticizer even when Examples 3-1 to 3-9 are mixed plasticizer compositions including epoxidized oil in 20% by weight or greater, it was indirectly identified that the effect is an effect induced by the additive. When comparing Examples 3-1 to 3-9 with Comparative Example 3-1 in which the additive content exceeded 100 parts by weight, it was identified that physical properties such as plasticizing efficiency, tensile strength, tensile retention, an elongation rate and elongation retention may decline when the additive was excessively included.

Existing DIDP plasticizers have excellent physical properties, but are a material having restrictions on the use due to environmental problems, and by additionally adding a trimellitate-based material, it was identified that plasticizer compositions capable of replacing the existing DIDP plasticizers may be provided in compound industries and the like.

Test Example 4: Mixed Plasticizer Composition of DOTP, ESO and Acetyl Citrate-Based Material Mixed plasticizer compositions were prepared by mixing DOTP and ESO, and each of ATOC and ATBC as an additive in the mixing ratios of Examples 4-1 to 4-8 and Comparative Example 4-1 listed in Table 4, and these were used as specimens for the tests. The preparation of the specimens and the physical property evaluations were the same as in Test Example 1, and the results are shown in the following Table 8.

|  | Plasticizer | Hardness (Shore "A") | Tensile Strength (kg/cm$^2$) | Tensile Retention (%) | Elongation Rate (%) | Elongation Retention (%) | Migration Loss (%) | Volatile Loss (%) | Stress Test |
|---|---|---|---|---|---|---|---|---|---|
| Example 4-1 | ATOC (43) | 87.5 | 188.6 | 98.6 | 304.8 | 95.6 | 0.63 | 3.55 | 0 |
| Example 4-2 | ATOC (43) | 87.0 | 188.7 | 101.2 | 308.7 | 94.5 | 0.91 | 4.89 | 0 |
| Example 4-3 | ATOC (25) | 86.5 | 190.3 | 105.4 | 310.2 | 94.3 | 0.50 | 4.92 | 0 |
| Example 4-4 | ATOC (67) | 88.1 | 189.6 | 98.2 | 305.1 | 96.4 | 0.48 | 3.28 | 0 |
| Example 4-5 | ATOC (100) | 88.8 | 190.8 | 97.5 | 304.8 | 96.5 | 0.42 | 3.03 | 0 |
| Example 4-6 | ATBC (43) | 85.8 | 172.8 | 115.0 | 311.4 | 88.1 | 1.32 | 11.90 | 0 |
| Example 4-7 | ATBC (25) | 86.2 | 180.5 | 105.7 | 322.0 | 85.6 | 1.16 | 10.98 | 0 |
| Example 4-8 | ATBC (25) | 85.9 | 175.9 | 107.3 | 315.7 | 89.2 | 0.55 | 9.38 | 0 |
| Comparative Example 2 | DIDP | 89.7 | 174.3 | 97.0 | 305.6 | 92.6 | 1.45 | 4.88 | 0 |
| Comparative Example 4-1 | ATOC (150) | 90.3 | 191.8 | 86.8 | 298.7 | 94.5 | 0.44 | 2.88 | 0 |

As shown in Table 8, it was identified that Examples 4-1 to 4-8 preparing the plasticizer composition by mixing epoxidized oil with DOTP, a terephthalate-based material, and further adding ATOC and ATBC among acetyl citrate-based materials as the additive exhibited an equal or higher level in the physical properties such as tensile strength, volatile loss, migration loss and an elongation rate compared to the existing DIDP plasticizer of Comparative Example 1.

In addition, considering that physical properties such as hardness or tensile strength are more superior compared to DIDP, an existing plasticizer even when Examples 4-1 to 4-8 are mixed plasticizer compositions including epoxidized oil in 20% by weight or greater, it was indirectly identified that the effect is an effect induced by the additive. When comparing Examples 4-1 to 4-8 with Comparative Example 4-1 in which the additive content exceeded 100 parts by weight, it was identified that physical properties such as plasticizing efficiency, an elongation rate and tensile retention may decline when the additive was excessively included.

Existing DIDP plasticizers have excellent physical properties, but are a material having restrictions on the use due to environmental problems, and by additionally adding an acetyl citrate-based material, it was identified that plasticizer compositions capable of replacing the existing DIDP plasticizers may be provided in compound industries and the like.

However, acetyl tributyl citrate has a rather small molecular weight and may have a problem in improving physical properties such as migration loss or volatile loss, and it was identified that adding materials having a high molecular weight as the additive was more preferable in compound industries in view of the above. Additives having a small molecular weight may have more superior elongation rate, hardness or the like other than migration loss and volatile loss compared to cases of adding other materials as the additive, and it can be seen that acetyl tributyl citrate may have advantages in terms of productivity and processability such as excellent plasticizing efficiency in industries other than wire compound industries emphasizing physical properties such as volatile loss such as calendaring sheets and flooring materials having simpler process conditions.

Hereinbefore, preferred examples of the present invention has been described in detail, however, the scope of the present invention is not limited thereto, and various modifications and improvements of those skilled in the art using the basic concept of the present invention defined in the claims are also included in the scope of the present invention.

MODE FOR CARRYING OUT THE INVENTION

Hereinafter, the present invention will be described in detail.

First, the present invention has technological features in providing a plasticizer composition capable of improving poor physical properties having been caused by structural limitation.

According to one embodiment of the present invention, a plasticizer composition comprising a terephthalate-based material may be provided. Specifically, the terephthalate-based material may be included in an amount selected from a range of from 1 wt % to 99 wt %, from 20 wt % to 99 wt % from 40 wt % to 99 wt %, from 50 wt % to 95 wt %, from 60 wt % to 90 wt %, or the like, based on the total weight of the composition.

As one example, the terephthalate-based material may have a terminal group independently selected from the group consisting of C-C12 alkyl groups, C3-C11 alkyl groups, C4-C10 alkyl groups, C8-C10 alkyl groups, C8-C9 alkyl groups or C8 alkyl group.

The terephthalate-based material may be any one selected from the group consisting of di(2-ethylhexyl) terephthalate (DEHTP or DOTP), diisononyl terephthalate (DINTP), dibutyl terephthalate (DBTP), butylisononyl terephthalate (BINTP), butyl(2-ethylhexyl) terephthalate (BEHTP or BOTP) and (2-ethylhexyl)isononyl terephthalate (EHINTP or OINTP).

More preferably, the terephthalate-based material may be di(2-ethylhexyl) terephthalate or diisononyl terephthalate.

In addition, according to one embodiment, the plasticizer composition may further comprise epoxidized oil, and for example, the epoxidized oil may comprise epoxidized soybean oil, epoxidized castor oil, epoxidized linseed oil, epoxidized palm oil, epoxidized stearate, epoxidized oleate, epoxidized tall oil, epoxidized linoleate or mixtures thereof.

Herein, in the plasticizer composition, weight ratio of the terephthalate-based material and the epoxidized oil may be from 99:1 to 1:99. The weight ratio of the terephthalate-based material and the epoxidized oil may be from 99:1 to 20:80, from 99:1 to 40:60, from 99:1 to 50:50 or from 99:1 to 60:40. And preferably, the weight ratio of the terephthalate-based material and the epoxidized oil may be from 95:5 to 50:50, 90:10 to 50:50 or from 90:10 to 60:40.

When increasing the amount of the epoxidized oil added, a migration resistance property for stress and an absorption rate may become excellent. Physical properties such as tensile strength or an elongation rate may somewhat decline, but may be included in the required physical property range. Accordingly, required physical properties may be freely controlled by the epoxidized oil content adjustment, and the epoxidized oil may be properly used depending on the use of a vinyl chloride-based resin composition.

In addition, the epoxidized oil may be preferably included in approximately 10 wt % or greater and more preferably included in 20 wt % or greater based on the total amount of the plasticizer composition.

Generally, epoxidized oil is sometimes included as a stabilizing agent when preparing a plasticizer, however, this may be distinguished from the above-mentioned epoxidized oil used as a second plasticizer. Using the terephthalate-based material as a first plasticizer is more environmental-friendly compared to phthalate-based materials such as diisodecyl phthalate having been used in the art as a plasticizer, however, reaching a level suited for commercialization may be difficult in terms of economic feasibility or existing physical properties, and adding epoxidized oil at a level of a stabilizing agent may be difficult to come close to physical properties accomplished by existing plasticizers.

However, when using epoxidized oil in 20 wt % or greater, migration resistance or an absorption property may become excellent, an absorption rate may be particularly excellent, and physical properties such as tensile strength or an elongation rate may be equal or better compared to existing phthalate-based plasticizers.

The plasticizer composition comprises a terephthalate-based material and epoxidized oil, and may further comprise an additive. The additive may be included in 1 part by weight to 100 parts by weight and preferably in 1 part by weight to 80 parts by weight based on 100 parts by weight of the plasticizer composition.

The additive may be mixed with the terephthalate-based compound alone and enhance a stress property and the like of a resin composition, however, even when such a small amount of the additive is mixed and included in the plasticizer composition, a compound and the like having excellent physical properties may be prepared. When a larger quantity of the additive is included, physical properties of the plasticizer composition may be out of control in controlling physical properties suitable for application, and problems such as excessively improving undesirable physical properties or declining desirable physical properties may occur.

Specifically, in the mixed plasticizer composition of the terephthalate-based material and the epoxidized oil, if the epoxidized oil is included in excess, the content of the terephthalate-based material is relatively low. In such cases, physical properties such as plasticizing efficiency relating to processability may not be relatively superior among various physical properties. And such a property may be complemented by further adding the additive.

When using an acetyl citrate-based material, a trimellitate-based material or a mixture thereof as the additive, empty space may be largely formed in the plasticizer composition due to large steric hindrance of the materials, and consequently, effects such as processability enhancement may be additionally accomplished and preferably, adding materials having a smaller molecular weight among the additives may be more helpful in enhancing processability.

The acetyl citrate-based material may comprise at least one compounds selected from the group consisting of a hybrid C4-C9 alkyl substituted acetyl citrate-based materials and a non-hybrid C4-C9 alkyl substituted acetyl citrate-based materials.

For example, the hybrid C4-C9 alkyl substituted acetyl citrate-based materials may be citrate having a combined substituent of C4-C8 alkyl groups such as 1,2-dibutyl 3-(2-ethylhexyl) 2-acetylpropane-1,2,3-tricarboxylate, 1,3-dibutyl 2-(2-ethylhexyl) 2-acetylpropane-1,2,3-tricarboxylate, 1-butyl 2,3-bis(2-ethylhexyl) 2-acetylpropane-1,2,3-tricarboxylate or 2-butyl 1,3-bis(2-ethylhexyl) 2-acetylpropane-1,2,3-tricarboxylate; acetyl citrate having a combined substituent of alkyl groups having 5 and 7 carbon atoms such as 1,2-dipentyl 3-heptyl 2-acetylpropane-1,2,3-tricarboxylate, 1,3-dipentyl 2-heptyl 2-acetylpropane-1,2,3-tricarboxylate, 1-pentyl 2,3-diheptyl 2-acetylpropane-1,2,3-tricarboxylate or 2-butyl 1,3-diheptyl 2-acetylpropane-1,2,3-tricarboxylate, or the like. In addition, the hybrid C4-C9 alkyl substituted acetyl citrate-based materials may be acetyl citrate having a combined substituent of two alkyl groups having a different number of carbon atoms selected from 4 to 9, and the like. The alkyl group may be linear or branched.

In the non-hybrid C4-C9 alkyl substituted acetyl citrate-based materials, the C4-C9 alkyl group may be linear or branched. For example, the non-hybrid C4-C9 alkyl substituted acetyl citrate-based materials may be tributyl acetyl citrate (ATBC), tripentyl acetyl citrate (ATPC), trihexyl acetyl citrate (ATHC), triheptyl acetyl citrate (ATHC), trioctyl acetyl citrate (ATOC), trinonyl acetyl citrate (ATNC) or the like, and the butyl group to the nonyl group may comprise each structural isomer, for example, an isobutyl group in the case of the butyl group, and a 2-ethylhexyl group in the case of the octyl group.

Although not limited thereto, the non-hybrid C4-C9 alkyl substituted acetyl citrate may be preferable compared to the hybrid alkyl substituted acetyl citrate, and tri(2-ethylhexyl) acetyl citrate may be used little more frequently.

However, when using an acetyl citrate-based material as the additive, the use of the plasticizer may vary depending on the molecular weight, and when the material having a large molecular weight is used, physical properties of the plasticizer oozing out such as migration loss or volatile loss may be complemented, and accordingly, the use in compound industries and the like may be preferable, and in the case of the material having a small molecular weight, the use in the fields requiring excellent processability may be preferable.

Like the acetyl citrate-based material, the trimellitate-based material may comprise trimellitate-based materials substituted with a non-hybrid C4-C9 alkyl, and the C4-C9 alkyl group may be linear or branched. For example, the trimellitate-based material may be tributyl trimellitate (TBTM), triisobutyl trimellitate (TiBTM), triethylhexyl trimellitate (TEHTM), triisononyl trimellitate (TINTM) or the like.

As means for preparing the plasticizer composition in the present invention, a blending method may be used, and one example of the blending preparation method is as follows.

The plasticizer composition may be prepared by providing a terephthalate-based material and epoxidized oil, and blending the terephthalate-based material and the epoxidized oil at a weight ratio of from 1:99 to 99:1

As for the terephthalate-based material, the terephthalate-based compound may be prepared by conducting direct esterification terephthalic acid and alcohol. The alcohol is at least one selected from the group consisting of 2-ethylhexyl alcohol, isononyl alcohol, butyl alcohol and isobutyl alcohol.

In addition, the method may further comprise mixing 1 part by weight to 100 parts by weight of an additive based on 100 parts by weight of the plasticizer composition after blending to prepare a plasticizer composition and descriptions thereon are as described above.

Herein, the additive may comprise an acetyl citrate-based material, a trimellitate-based material or a mixture thereof, and descriptions thereon are as described above.

The direct esterification may be conducted by adding terephthalic acid to an alcohol, then adding a catalyst, and reacting the result under nitrogen atmosphere; removing the unreacted alcohol, and neutralizing the unreacted acid; and dehydrating and filtering through vacuum distillation.

The alcohol used in the blending preparation method may be used in an amount of 150 mol % to 500 mol %, 200 mol % to 400 mol %, 200 mol % to 350 mol %, 250 mol % to 400 mol % or 270 mol % to 330 mol % based on 100 mol % of the terephthalic acid.

Meanwhile, for example, the catalyst used in the blending preparation method may comprise at least one selected from the group consisting of acid catalysts such as sulfuric acid, hydrochloric acid, phosphoric acid, nitric acid, paratoluenesulfonic acid, methanesulfonic acid, ethanesulfonic acid, propanesulfonic acid, butanesulfonic acid and alkyl sulfuric acid, metal salts such as aluminum sulfate, lithium fluoride, potassium chloride, cesium chloride, calcium chloride, iron chloride and aluminum phosphate, metal oxides such as heteropolyacid, natural/synthetic zeolite, cation and anion exchange resins, and organic metals such as tetra alkyl titanate and polymers thereof. As specific examples thereof, tetra alkyl titanate may be used as the catalyst.

The amount of the catalyst used may be different depending on the types, and as one example, a homogeneous catalyst may be used in an amount of 0.01 wt % to 5 wt %, 0.01 wt % to 3 wt %, 1 wt % to 5 wt % or 2 wt % to 4 wt % based on 100 wt % of the total reactants, and a heterogeneous catalyst may be used in an amount of 5 wt % to 200 wt %, 5 wt % to 100 wt %, 20 wt % to 200 wt % or 20 wt % to 150 wt % based on the total weight of the reactants.

Herein, the reaction temperature may be from 180° C. to 280° C., from 200° C. to 250° C. or from 210° C. to 230° C.

The direct esterification and a trans-esterification to be described later may also be used in preparing the hybrid or non-hybrid acetyl citrate-based material or the trimellitate-based material described above. In this case, the acetyl citrate-based material may also be prepared as a mixed composition having a certain ratio, and a composition ratio of the produced mixture may be controlled depending on the adjustment of alcohol content as a reaction raw material.

Besides, when the acetyl citrate-based material or the trimellitate-based material is prepared through a direct esterification or a trans-esterification, descriptions used in preparing the terephthalate-based material may be used in the same manner.

The "trans-esterification" used in the present invention means a reaction in which an alcohol and an ester react to exchange R" of the ester with R' of the alcohol as shown in Reaction Formula 1 below:

[Reaction Formula 1]

According to one embodiment, when the trans-esterification is progressed, 3 kinds of ester compositions may be produced by three number of cases such as alkoxide of the alcohol attacking carbon of two ester (RCOOR") groups present in the ester-based compound; alkoxide of the alcohol attacking carbon of one ester (RCOOR") group present in the ester-based compound; and being unreacted with no reactions.

In addition, the trans-esterification has an advantage of not causing a problem of waste water compared to an esterification reaction between acid-alcohol, and may be progressed without a catalyst, and therefore, is capable of solving a problem caused by the use of an acid catalyst.

In addition, the mixture prepared through the trans-esterification may control a composition ratio of the mixture depending on the amount of the alcohol added.

The amount of the alcohol added may be from 0.1 parts by weight to 89.9 parts by weight, specifically from 3 parts by weight to 50 parts by weight and more specifically from 5 parts by weight to 40 parts by weight based on 100 parts by weight of the ester.

As for the ester, a mole fraction of the ester participating in the trans-esterification increases as the amount of the added alcohol increases, and therefore, content of the two ester compounds, a product, may increase in the mixture, and accordingly, the content of the ester compound present unreacted corresponding thereto tends to decrease.

According to one embodiment of the present invention, a molar ratio of the ester and the alcohol, which are reactants, may be, for example, from 1:0.005 to 5.0, from 1:0.05 to 2.5, or from 1:0.1 to 1.0, and in these ranges, an effect of preparing an ester-based plasticizer composition having high process efficiency and an excellent processability improving effect is obtained.

According to one embodiment of the present invention, the trans-esterification may be conducted at a reaction temperature from 120° C. to 190° C., preferably from 135° C. to 180° C. and more preferably from 141° C. to 179° C. for from 10 minutes to 10 hours, preferably from 30 minutes to 8 hours and more preferably from 1 hour to 6 hours. The mixture that is an ester having a target composition may be effectively prepared within the above-mentioned temperature and time ranges. Herein, the reaction time may be calculated from the time reaching a reaction temperature after raising the temperature of the reactants.

The trans-esterification may be conducted under the presence of an acid catalyst or a metal catalyst, and in this case, an effect of shorter reaction time is obtained.

Examples of the acid catalyst may comprise sulfuric acid, methanesulfonic acid, p-toluenesulfonic acid or the like, and examples of the metal catalyst may comprise organic metal catalysts, metal oxide catalysts, metal salt catalysts or metals themselves.

Examples of the metal component may be at least one selected from the group consisting of tin, titanium and zirconium these.

In addition, after the trans-esterification reaction, the trans-esterification may further comprise distilling unreacted alcohol and reaction byproducts such as an ester-based compound represented by Chemical Formula 3 to remove the unreacted alcohol and the reaction byproducts.

One example of the distillation may comprise two-step distillation conducting separation of the alcohol and the reaction byproducts using a boiling point difference.

As another example, the distillation may be mixed distillation. In this case, an effect of relatively stably securing the ester-based plasticizer composition in a target composition is accomplished. The mixed distillation means distilling the butanol and the reaction byproduct at the same time.

A resin composition may comprise 5 parts by weight to 150 parts by weight, 40 parts by weight to 100 parts by weight, or 40 parts by weight to 50 parts by weight of the plasticizer composition based on 100 parts by weight of a resin. The resin is selected from the group consisting of ethylene vinyl acetate, polyethylene, polypropylene, polyketone, polyvinyl chloride, polystyrene, polyurethane and thermoplastic elastomers. The resin composition is effective for all of compound formularization, sheet formularization and plastisol formularization.

As one example, the plasticizer composition may be used in manufacturing wires, flooring materials, automotive interior materials, films, sheets, wallpapers or tubes.

What is claimed is:

1. A plasticizer composition comprising:
one kind of terephthalate-based material; and
epoxidized oil; and
an additive, which is a trimellitate-based material,
wherein weight ratio of the terephthalate-based material and the epoxidized oil is from 90:10 to 1:99,
wherein the epoxidized oil is included in 10% by weight or greater with respect to the total amount of the plasticizer composition, and
wherein the trimellitate-based material comprises one or more selected from the group consisting of tri(2-ethylhexyl) trimellitate and triisononyl trimellitate.

2. The plasticizer composition of claim 1, wherein the weight ratio of the terephthalate-based material and the epoxidized oil is from 90:10 to 50:50.

3. The plasticizer composition of claim 1, wherein the terephthalate-based material is any one selected from the group consisting of di(2-ethylhexyl) terephthalate (DEHTP or DOTP), diisononyl terephthalate (DINTP), dibutyl terephthalate (DBTP), butylisononyl terephthalate (BINTP), butyl(2-ethylhexyl) terephthalate (BEHTP or BOTP) and (2-ethylhexyl)isononyl terephthalate (EHINTP or OINTP).

4. The plasticizer composition of claim 3, wherein the terephthalate-based material is di(2-ethylhexyl) terephthalate or diisononyl terephthalate.

5. The plasticizer composition of claim 1, wherein the epoxidized oil comprises at least one selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

6. The plasticizer composition of claim 1, wherein the additive is comprised 1 part by weight to 100 parts by weight based on 100 parts by weight of the plasticizer composition.

7. A method for preparing a plasticizer composition comprising:
  providing one kind of terephthalate-based material and epoxidized oil;
  blending the terephthalate-based material and the epoxidized oil at weight ratio of from 90:10 to 1:99 to prepare a plasticizer composition; and
  mixing a trimellitate-based material with the plasticizer composition, and
  wherein the epoxidized oil is included in 10% by weight or greater with respect to the total amount of the plasticizer composition,
  wherein the trimellitate-based material comprises one or more selected from the group consisting of tri(2-ethylhexyl) trimellitate and triisononyl trimellitate.

8. The method for preparing the plasticizer composition of claim 7, wherein the terephthalate-based material is prepared by conducting direct esterification of an alcohol and terephthalic acid, wherein the alcohol is selected from the group consisting of 2-ethylhexyl alcohol, isononyl alcohol, butyl alcohol and isobutyl alcohol.

9. The method for preparing the plasticizer composition of claim 7, wherein the trimellitate-based material is mixed with the plasticizer composition in an amount of 1 part by weight to 100 parts by weight based on 100 parts by weight of the plasticizer composition.

10. A resin composition comprising:
  100 parts by weight of a resin; and
  5 parts by weight to 150 parts by weight of the plasticizer composition of claim 1.

11. The resin composition of claim 10, wherein the resin is at least one selected from the group consisting of ethylene vinyl acetate, polyethylene, polyketone, polypropylene, polyvinyl chloride, polystyrene, polyurethane and thermoplastic elastomers.

12. The resin composition of claim 10, wherein the resin composition is a material for at least one selected from the group consisting of wires, flooring materials, automotive interior materials, films, sheets, wallpapers and tubes.

* * * * *